(12) United States Patent
Yang

(10) Patent No.: US 12,408,195 B2
(45) Date of Patent: Sep. 2, 2025

(54) METHOD AND APPARATUS FOR RANDOM ACCESS TYPE SELECTION

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 472 days.

(21) Appl. No.: 17/812,323

(22) Filed: Jul. 13, 2022

(65) Prior Publication Data

US 2022/0353907 A1 Nov. 3, 2022

Related U.S. Application Data

(63) Continuation of application No. PCT/CN2020/073206, filed on Jan. 20, 2020.

(51) Int. Cl.
*H04W 74/02* (2009.01)
*H04W 74/08* (2024.01)
*H04W 74/0833* (2024.01)
*H04W 74/0836* (2024.01)
*H04W 74/0838* (2024.01)

(52) U.S. Cl.
CPC ....... *H04W 74/02* (2013.01); *H04W 74/0833* (2013.01); *H04W 74/0841* (2013.01); *H04W 74/0866* (2013.01); *H04W 74/0836* (2024.01); *H04W 74/0838* (2024.01)

(58) Field of Classification Search
None
See application file for complete search history.

(56) References Cited

U.S. PATENT DOCUMENTS

| 2004/0014452 | A1* | 1/2004 | Lim | H04B 7/18558 455/450 |
| 2010/0008252 | A1* | 1/2010 | Alve | H04L 63/0492 370/252 |
| 2014/0314014 | A1* | 10/2014 | Zhang | H04W 52/346 370/329 |
| 2015/0067035 | A1* | 3/2015 | Sullad | H04L 63/126 709/203 |

(Continued)

FOREIGN PATENT DOCUMENTS

| CN | 108738134 | 11/2018 |
| CN | 109863817 | 6/2019 |

OTHER PUBLICATIONS

LG Electronics, "Discussion on Procedure for 2-step RACH," 3GPP TSG RAN WG1 Meeting #99, R1-1912263, Nov. 2019.

(Continued)

*Primary Examiner* — Ayman A Abaza
*Assistant Examiner* — Camquyen Thai
(74) *Attorney, Agent, or Firm* — Hodgson Russ LLP

(57) ABSTRACT

A method and apparatus for random access type selection are provided. A terminal device selects a random access type according to target information, where the target information includes at least one of a round trip time (RTT) of signal propagation between the terminal device and a network device, a timing advance (TA) estimated by the terminal device, or a reference signal received power (RSRP) measured by the terminal device.

13 Claims, 5 Drawing Sheets

---

SELECT, BY A TERMINAL DEVICE, A RANDOM ACCESS TYPE ACCORDING TO TARGET INFORMATION, WHERE THE TARGET INFORMATION INCLUDES AT LEAST ONE OF AN RTT OF SIGNAL PROPAGATION BETWEEN THE TERMINAL DEVICE AND A NETWORK DEVICE, A TA ESTIMATED BY THE TERMINAL DEVICE, OR AN RSRP MEASURED BY THE TERMINAL DEVICE  /801

(56) References Cited

U.S. PATENT DOCUMENTS

| | | | |
|---|---|---|---|
| 2016/0127069 A1* | 5/2016 | Nuss | H04J 11/005 370/329 |
| 2017/0079035 A1* | 3/2017 | Seo | H04W 72/0453 |
| 2018/0205516 A1* | 7/2018 | Jung | H04W 74/0836 |
| 2018/0279186 A1* | 9/2018 | Park | H04W 36/302 |
| 2019/0342921 A1 | 11/2019 | Loehr et al. | |
| 2020/0252967 A1* | 8/2020 | Ozturk | H04W 74/0808 |
| 2022/0007455 A1* | 1/2022 | Hong | H04L 9/40 |
| 2022/0022259 A1* | 1/2022 | Atungsiri | H04W 72/23 |
| 2022/0104278 A1* | 3/2022 | Lin | H04W 74/0833 |
| 2022/0174752 A1* | 6/2022 | Xing | H04W 24/10 |
| 2022/0256445 A1* | 8/2022 | Sedin | H04B 7/18539 |

OTHER PUBLICATIONS

EPO, Extended European Search Report for EP Application No. 20915216.4, Dec. 19, 2022.
Panasonic, Loading Control in the RACH Type Selection, 3GPP TSG-RAN WG2 Meeting#107bis, R2-1912692 (Revision of R2-1909238), Oct. 2019.
Huawei et al., "Discussion on 2-step RACH procedure," 3GPP TSG RAN WG1 Meeting #98bis, R1-1910032, Oct. 2019.
WIPO, International Search Report and Written Opinion for International Application No. PCT/CN2020/073206, Oct. 21, 2020.

* cited by examiner

SELECT, BY A TERMINAL DEVICE, A RANDOM ACCESS TYPE ACCORDING TO TARGET INFORMATION, WHERE THE TARGET INFORMATION INCLUDES AT LEAST ONE OF AN RTT OF SIGNAL PROPAGATION BETWEEN THE TERMINAL DEVICE AND A NETWORK DEVICE, A TA ESTIMATED BY THE TERMINAL DEVICE, OR AN RSRP MEASURED BY THE TERMINAL DEVICE ⎯ 801

METHOD AND APPARATUS FOR RANDOM ACCESS TYPE SELECTION

CROSS REFERENCE TO RELATED APPLICATION(S)

This application is a continuation of International Application No. PCT/CN2020/073206, filed Jan. 20, 2020, the entire disclosure of which is incorporated herein by reference.

TECHNICAL FIELD

This application relates to the field of communication technology, and specifically to a method and apparatus for random access type selection.

BACKGROUND

Currently, two types of random access are supported, such as a 4-step random access and a 2-step random access. If a network device configures for a terminal device both a resource used for the 2-step random access and a resource used for the 4-step random access, the terminal device needs to select a random access type before random access. Therefore, how to select the random access type is a technical problem to be solved.

SUMMARY

In a first aspect, a method for random access type selection is provided in implementations of the disclosure. The method is applicable to a terminal device. The method includes the following. A random access type is selected according to target information, where the target information includes at least one of a round trip time (RTT) of signal propagation between the terminal device and a network device, a timing advance (TA) estimated by the terminal device, or a reference signal received power (RSRP) measured by the terminal device.

In a second aspect, an information transmission method is provided in implementations of the disclosure. The method is applicable to a network device. The method includes the following. Configuration information is broadcast, where the configuration information includes a first random access channel (RACH) resource configuration used for a contention-based 4-step random access and a message A (msgA) resource configuration used for a contention-based 2-step random access, the configuration information further includes at least one of an RTT threshold or a TA threshold, and the msgA resource configuration includes a second RACH resource configuration and a physical uplink shared channel (PUSCH) resource configuration.

In a third aspect, a terminal device provided in implementations of the disclosure. The terminal device includes a processor and a memory storing computer programs. When executed by the processor, the computer programs are operable with the process to: select a random access type according to target information, where the target information includes at least one of an RTT of signal propagation between the terminal device and a network device, a TA estimated by the terminal device, or an RSRP measured by the terminal device.

In a fourth aspect, a network device is provided in implementations of the disclosure. The network device includes a transceiver, a processor, and a memory storing computer programs. When executed by the processor, the computer programs are operable with the transceiver to broadcast configuration information, where the configuration information includes a first RACH resource configuration used for a contention-based 4-step random access and a msgA resource configuration used for a contention-based 2-step random access, the configuration information further includes at least one of an RTT threshold or a TA threshold, and the msgA resource configuration includes a second RACH resource configuration and a PUSCH resource configuration.

BRIEF DESCRIPTION OF THE DRAWINGS

In order to describe more clearly technical solutions of implementations of the disclosure, the following will give a brief introduction to the accompanying drawings used for describing the implementations. Apparently, the accompanying drawings described below are some implementations of the disclosure. Based on these drawings, those of ordinary skill in the art can also obtain other drawings without creative effort.

DETAILED DESCRIPTION

Terms used in the detailed description of the disclosure are merely intended for explaining implementations of the disclosure rather than limiting the disclosure. The terms "first", "second", "third", "fourth", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion.

Figure 1:
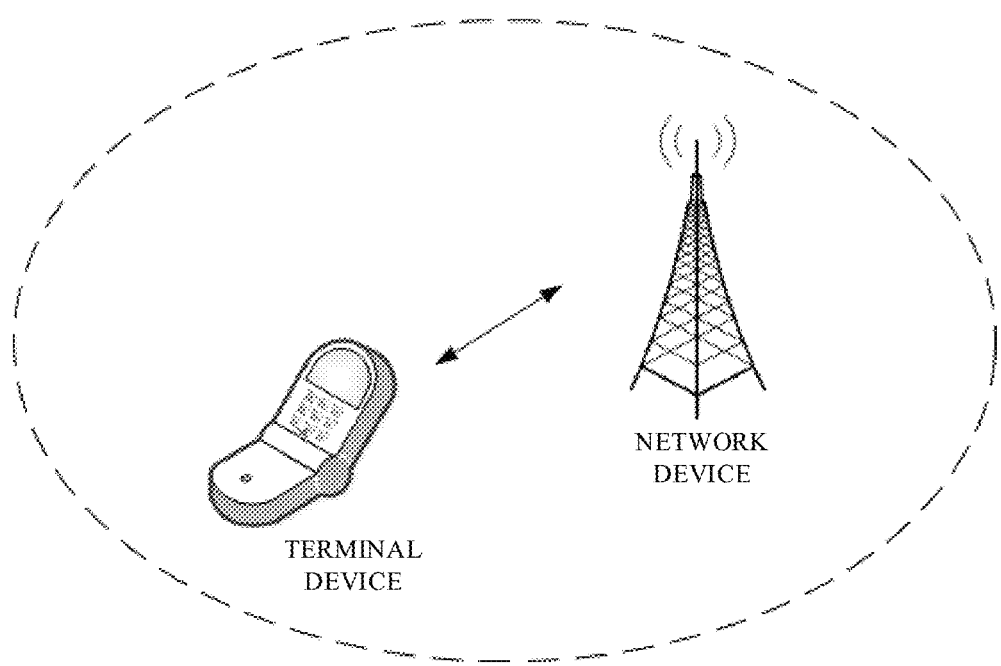
FIG. 1 is a schematic architectural diagram of a communication system provided in implementations of the disclosure.

Refer to FIG. 1, which is a schematic architectural diagram of a communication system provided in implementations of the disclosure. The communication system includes a network device and a terminal device. As illustrated in FIG. 1, the network device can communicate with the terminal device. The communication system may be a global system of mobile communication (GSM), a code division multiple access (CDMA) system, a wideband code division multiple access (WCDMA) system, a worldwide interoperability for microwave access (WiMAX) system, a long term evolution (LTE) system, a $5^{th}$ generation (5G) communication system (such as new radio (NR)), a communication system that integrates multiple communication technologies (such as communication system that integrates LTE technology and NR technology), or a future evolved communication system. The form and quantity of the network device and the terminal device illustrated in FIG. 1 are merely intended for illustration, and do not constitute limitation on implementations of the disclosure.

The terminal device in the disclosure is a device with wireless communication functions. The terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.). The terminal device can be a mobile phone, a pad, a computer with wireless transceiver functions, a virtual reality (VR) terminal device, an augmented reality (AR) terminal device, a wireless terminal in industrial control, a wireless terminal in self driving, a wireless terminal in remote medicine, a wireless terminal in smart grid, a wireless terminal in smart home, etc. The terminal device may also be a handheld device with wireless communication functions, an in-vehicle device, a wearable device, a computer device, or other processing devices coupled with a wireless modem, etc. Terminal devices in different networks may be called different names, for example, terminal device, access terminal, subscriber unit, subscriber station, mobile station, remote station, remote terminal, mobile device, user terminal, terminal, wireless communication device, user agent or user device, cellular radio telephone, cordless telephone, session initiation protocol (SIP) telephone, wireless local loop (WLL) station, personal digital assistant (PDA), terminal device in a 5G network or in a future evolved network, etc.

The network device in the disclosure is a device that is deployed in a radio access network (RAN) to provide wireless communication functions. For example, the network device may be a RAN device at an access-network side in a cellular network. The RAN device is a device for access of the terminal device to a radio network, which includes but is not limited to: an evolved Node B (eNB), a radio network controller (RNC), a Node B (NB), a base station controller (BSC), a base transceiver station (BTS), a home base station (such as home evolved Node B, or home Node B (HNB)), a base band unit (BBU), and a mobility management entity (MME). For another example, the network device may also be a node device in a wireless local area network (WLAN), such as access controller (AC), gateway, or wireless fidelity (WIFI) access point (AP). For another example, the network device may also be a transmission node or transmission reception point (TRP or TP) in an NR system, etc.

At present, the $3^{rd}$ generation partnership project (3GPP) is studying non-terrestrial network (NTN) technology. NTN generally provides communication services to terrestrial users through satellite communication. Compared with terrestrial cellular network communication, satellite communication has many unique advantages. First, satellite communication is not constrained by areas of users. For example, terrestrial communication is unable to cover areas without communication coverage like sparsely populated areas as well as areas where communication devices cannot be set up, such as oceans, mountains, and deserts. In contrast, for satellite communication, one satellite can cover a large ground and the satellite can orbit the earth. Therefore, in theory, every corner on the earth can be covered for satellite communication. Second, satellite communication has greater social value. Remote mountainous areas and poverty-stricken and underdeveloped countries or regions can be covered for satellite communication at a low cost, so that people in these areas can enjoy advanced voice communication and mobile internet technologies, thereby narrowing a digital gap with developed areas and thus promoting development of these areas. Third, a satellite has a long communication distance, and increase in communication distance will not lead to substantial increase in communication cost. Finally, satellite communication has high stability and is not constrained by natural disasters.

Communication satellites are classified into low-earth orbit (LEO) satellites, medium-earth orbit (MEO) satellites, geostationary earth orbit (GEO) satellites, high elliptical orbit (HEO) satellites, and the like according to different orbital altitudes.

For the LEO satellite, the orbital altitude thereof ranges from 500 km (kilometer) to 1500 km, an orbital period is about 1.5 hours to 2 hours, and a signal propagation delay of single-hop communication between users is generally less than 20 ms (millisecond). A satellite has a maximum visibility time of 20 minutes, a short signal propagation distance, and a less link loss, and does not have high requirements on transmission power for the terminal device.

For the GEO satellite, the orbital altitude thereof is 35786 km, an orbital period is 24 hours, and a signal propagation delay of single-hop communication between users is generally 250 ms.

In order to ensure the coverage of the satellite and increase the system capacity of the entire satellite communication system, the satellite uses multi-beams to cover the ground. One satellite can provide tens of or even hundreds of beams for ground coverage, and one satellite beam can cover a ground area with a diameter of tens to hundreds of kilometers.

A random access procedure may be triggered mainly by at least one of the following events: (1) The terminal device establishes a wireless connection in initial access when the terminal device transitions from radio resource control (RRC)_IDLE to RRC_CONNECTED; (2) RRC connection re-establishment procedure, so that the terminal device re-establishes a wireless connection after radio link failure; (3) Handover: The terminal device needs to establish uplink (UL) synchronization with a new cell; (4) Downlink data arrival during RRC_CONNECTED when UL synchronization status is "non-synchronized"; (5) UL data arrival during RRC_CONNECTED when UL synchronization status is "non-synchronized" or there is no available physical uplink control channel (PUCCH) resource for transmission of scheduling request (SR); (6) SR failure; (7) Request by RRC upon synchronous reconfiguration; (8) The terminal device transitions from RRC INACTIVE to RRC_CONNECTED; (9) To establish time alignment upon secondary cell (SCell) addition; (10) Request for other system information (SI); (11) Beam failure recovery.

Figure 2:
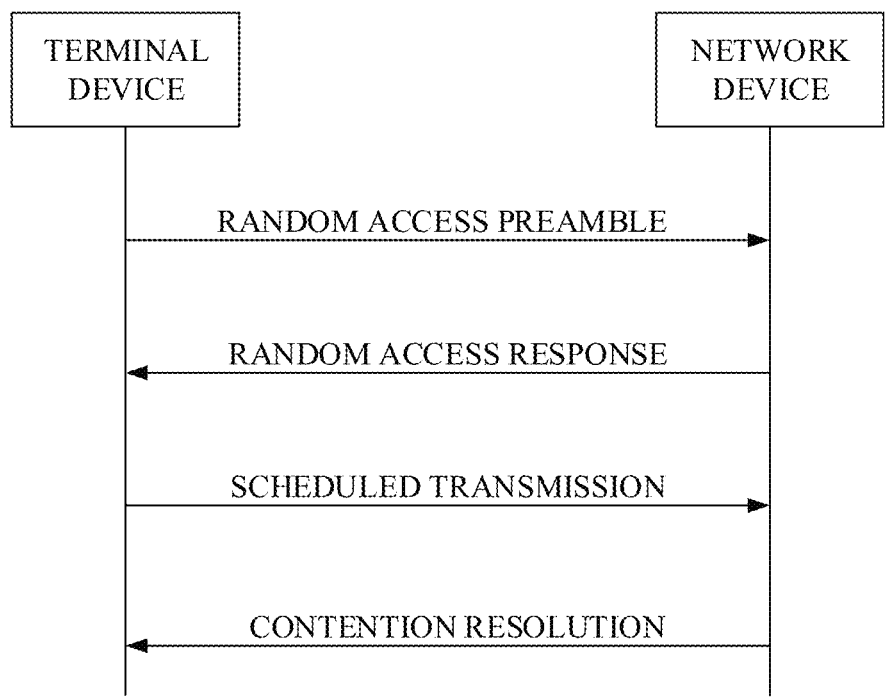
FIG. 2 is a schematic diagram of a contention-based random access provided in implementations of the disclosure.
Figure 3:
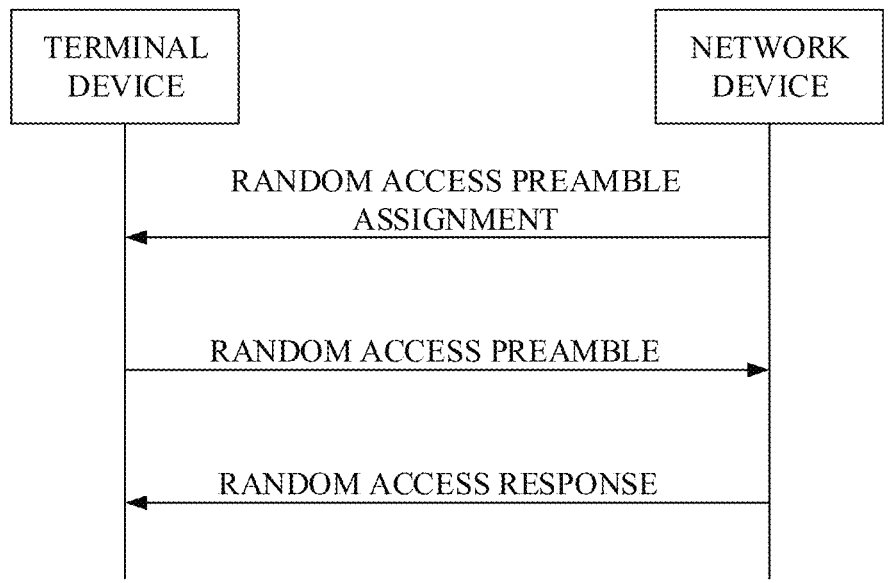
FIG. 3 is a schematic diagram of a contention-free random access provided in implementations of the disclosure.

In NR release (Rel)-15, two types of random access are supported: a contention-based random access (as illustrated in FIG. 2) and a contention-free random access (as illustrated in FIG. 3). As illustrated in FIG. 2 and FIG. 3:

1. A terminal device transmits message (msg)1 to a network device, where the msg1 is a random access preamble.

The terminal selects a physical random access channel (PRACH) resource, and transmits a selected preamble on the selected PRACH. In case of a contention-free random access, the PRACH resource and the preamble may be specified by a network device. Based on the preamble, the network device can estimate a UL timing and a size of a UL grant required by the terminal device for transmission of msg3.

2. The network device transmits msg2 to the terminal device, where the msg2 is a random access response (RAR).

After transmitting the msg1, the terminal device starts a random access response window, and monitors a random access radio network temporary identifier (RA-RNTI) scrambled physical downlink control channel (PDCCH) in the random access response window.

Once the RA-RNTI scrambled PDCCH is received successfully by the terminal device, the terminal device can obtain a physical downlink shared channel (PDSCH) scheduled by the PDCCH, where the PDSCH includes an RAR. The RAR specifically contains the following information:

A backoff indicator (BI) contained in a subheader of the RAR, which is indicates a backoff time for retransmission of the msg1;

A random access preamble index (RAP ID) in the RAR: the network device responds to a received preamble index.

A timing advance group (TAG) contained in a payload of the RAR, which is used for UL timing adjustment;

UL grant: used for scheduling a UL resource indication of msg3;

Temporary cell-radio network temporary identifier (TC-RNTI): used for scrambling a PDCCH of msg4 (initial access).

If an RAR-RNTI scrambled PDCCH is received by the terminal device, and the RAR contains a preamble index transmitted by the terminal device, the terminal device considers that the RAR is successfully received.

For a contention-free random access, once the msg2 is successfully received by the terminal device, the random access procedure is completed. For a contention-based random access, after the msg2 is successfully received by the terminal device, the terminal device still needs to transmit msg3 and receive msg4.

3. The terminal device transmits msg3 on a resource scheduled by the network device, where the msg3 is scheduled transmission.

The msg3 is mainly used for notifying the network device which event has triggered the random access procedure. For example, in case of a random access procedure for initial access, an identity (ID) of the terminal device and an establishment cause are carried in the msg3. In case of RRC reestablishment, an identifier of the terminal device in a connected mode and an establishment cause are carried.

4. The network device transmits msg4 to the terminal device, where the msg4 is a contention resolution.

On one hand, the msg4 is used for contention resolution; and on the other hand, the msg4 is used by the network device to transmit an RRC configuration message to the terminal device. Contention resolution may be in the following two manners: i) if a C-RNTI is carried in the msg3 by the terminal device, the msg4 is scheduled by a C-RNTI scrambled PDCCH; ii) if no C-RNTI is carried in the msg3 by the terminal device, for example, in initial access, the msg4 is scheduled by a TC-RNTI scrambled PDCCH. For contention resolution, the terminal device receives a PDSCH of the msg4, and compares a common control channel (CCCH) service data unit (SDU) in the PDSCH with a CCCH SDU in the msg 3 transmitted by the UE, if the two CCCH SDUs match, the random access is successful.

Figure 4:
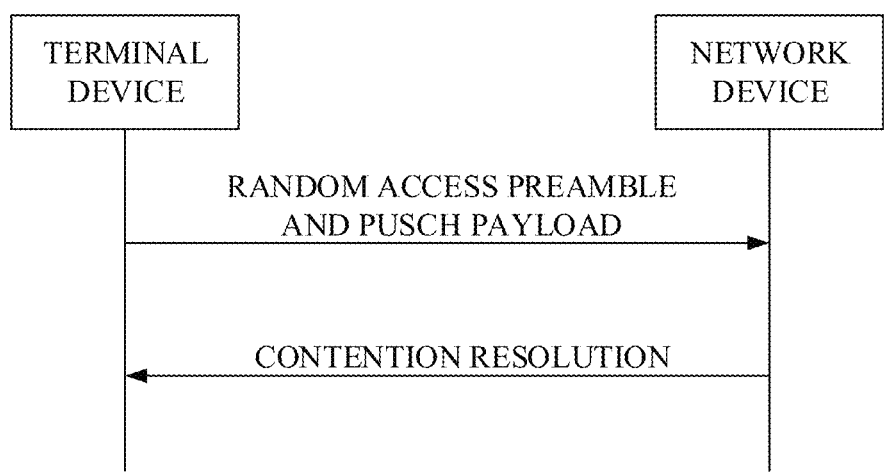
FIG. 4 is a schematic diagram of a 2-step random access provided in implementations of the disclosure.
Figure 5:
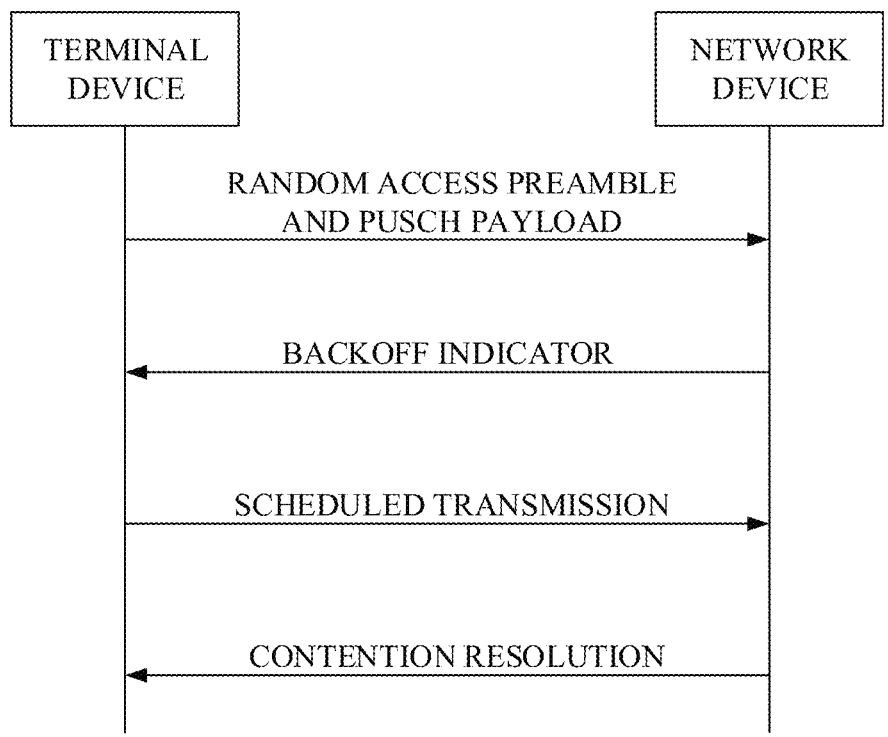
FIG. 5 is a schematic diagram of a 4-step random access provided in implementations of the disclosure.

A 2-step random access procedure is introduced in NR Rel-16, which can reduce signaling overhead while reducing delay. MsgA in a 2-step random access contains a preamble transmitted on a PRACH and load information transmitted on a physical uplink shared channel (PUSCH). After transmission of the msgA, the terminal device monitors a response of the network device in a configured window. If an indication of success in contention resolution issued by the network device is received, the terminal device ends the random access procedure, as illustrated in FIG. 4. If a BI is received in msgB, the terminal device transmits msg3 and monitors a contention resolution result, as illustrated in FIG. 5. If contention resolution is still not successful after transmission of the msg3, the terminal device continues transmitting the msgA, where the msgA is random access preamble+PUSCH payload, and the msgB is RAR+contention resolution.

After introduction of the 2-step random access, if the network device configures for the terminal device both a msgA resource used for the 2-step random access and a RACH resource used for a 4-step random access, for a contention-based random access, the terminal device first needs to select a random access type before random access. A conclusion of the current NR standardization is that the terminal device selects the random access type based on reference signal receiving power (RSRP) measurement. If an RSRP measured by the terminal device is greater than an RSRP threshold configured by the network device, the terminal device adopts the 2-step random access; otherwise, the terminal device adopts the 4-step random access.

Figure 6:
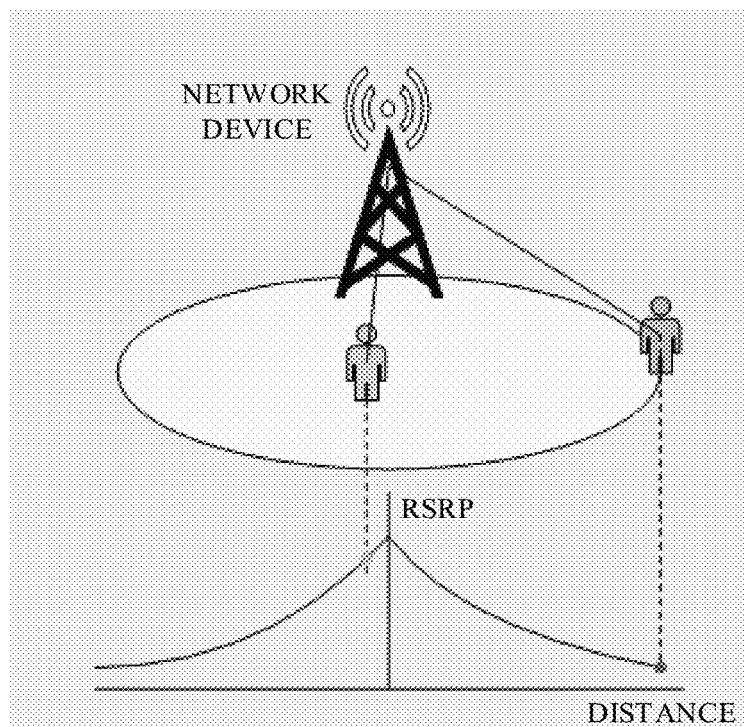
FIG. 6 is a schematic diagram of a terminal device and a network device in a new radio (NR) system provided in implementations of the disclosure.

In an NR system, as illustrated in FIG. 6, an RSRP when a terminal device is at the center of a cell is significantly higher than an RSRP when the terminal device is at the edge of the cell. Due to "near-far effect", it is possible to select the random access type based on RSRP measurement, that is, the terminal device can determine, through RSRP measurement, whether its channel state is good enough such that the terminal device can adopt a 2-step random access to reduce delay of an access network.

Figures 7, 8:
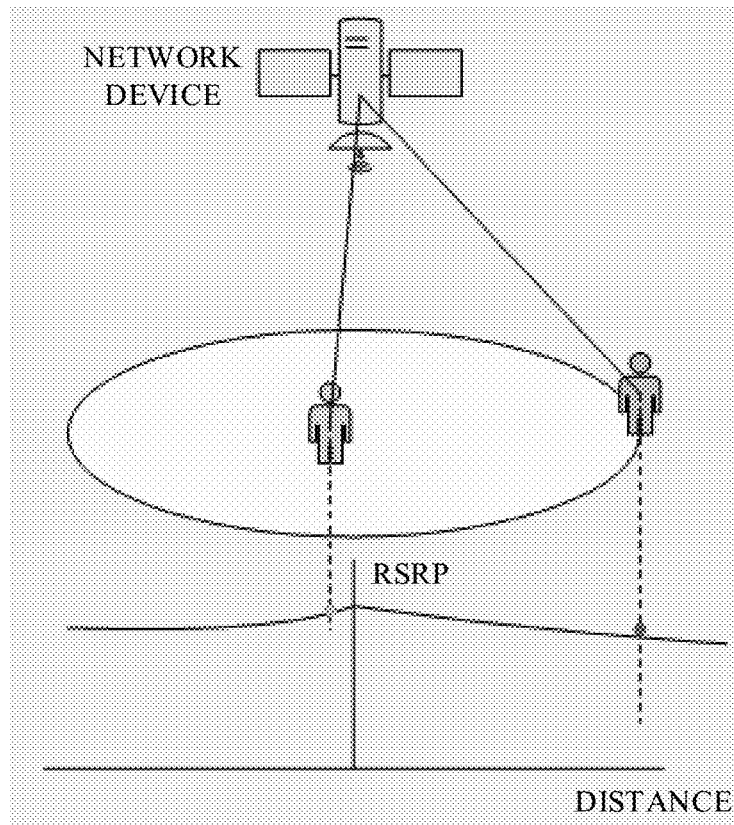
FIG. 7 is a schematic diagram of a terminal device and a network device in a non-terrestrial network (NTN) system provided in implementations of the disclosure.
FIG. 8 is a schematic flowchart of a method for random access type selection provided in implementations of the disclosure.

In an NTN system, as illustrated in FIG. 7, a difference between an RSRP of a terminal device at the center of a cell and an RSRP of the terminal device at the edge of the cell is small. If the random access type is selected based on RSRP measurement, on one hand, it is hard to set an RSRP threshold for random access type selection, and on the other hand, the terminal device is likely to select an improper random access type due to errors in RSRP measurement. An RSRP measured by the terminal device at the center of the cell is undermeasured and as a result, the terminal device selects a 4-step random access, thus increasing delay of random access. An RSRP measured by the terminal device at the edge of the cell is overmeasured and as a result, a 2-step random access is selected. However, the 2-step random access will fail despite multiple attempts, and as a result, the terminal device has to back off to a 4-step random access or the random access directly fails, thus seriously affecting communication efficiency.

Refer to FIG. 8, which is a schematic flowchart of a method for random access type selection provided in implementations of the disclosure. The method includes the following.

Step 801, a terminal device selects a random access type according to target information, where the target information includes at least one of a round trip time (RTT) of signal propagation between the terminal device and a network device, a timing advance (TA) estimated by the terminal device, or an RSRP measured by the terminal device.

The terminal device may determine the RTT of signal propagation between the terminal device and the network device as follows. The terminal device calculates a distance between the terminal device and the network device according to a position of the terminal device and a position of the network device, and divides the obtained distance by a speed of light to obtain the RTT. In addition, the manner of estimating the TA by the terminal device is the same as the manner of determining the RTT by the terminal device, which will not be elaborated again herein.

The method for random access type selection is applicable to an NTN system.

In an implementation, before the terminal device selects the random access type according to the target information, the method further includes the following. The network device broadcasts configuration information, where the configuration information includes a first random access channel (RACH) resource configuration used for a contention-based 4-step random access and a msgA resource configuration used for a contention-based 2-step random access, the configuration information further includes at least one of an RTT threshold or a TA threshold, and the msgA resource configuration includes a second RACH resource configuration and a PUSCH resource configuration. The terminal device receives the configuration information broadcast by the network device.

Optionally, the configuration information further includes an RSRP threshold.

The configuration information is carried by a system message, such as system information block (SIB) 1, SIB 2, SIB 3, etc.

Optionally, if the network device configures for the terminal device a msgA resource used for a contention-free 2-step random access, the terminal device initiates the contention-free 2-step random access. If the network device configures for the terminal device a RACH resource used for a contention-free 4-step random access, the terminal device initiates the contention-free 4-step random access. If the network device does not configure for the terminal device the msgA resource used for a contention-free 2-step random access and does not configure for the terminal device the RACH resource used for a contention-free 4-step random access either, the terminal device adopts a contention-based random access.

In an implementation, the method includes the following. If the contention-based 2-step random access is selected, the terminal device transmits msgA on a first resource, where the first resource includes one RACH resource selected from the second RACH resource configuration and one PUSCH resource selected from the PUSCH resource configuration. If the contention-based 4-step random access is selected, the terminal device transmits msg1 on a second resource, where the second resource includes one RACH resource selected from the first RACH resource configuration. The network device receives the msgA or the msg1 transmitted by the terminal device.

In an implementation, the terminal device selects the random access type according to the target information as follows. If the RTT is less than the RTT threshold, the terminal device selects the contention-based 2-step random access. If the RTT is greater than or equal to the RTT threshold, the terminal device selects the contention-based 4-step random access.

As can be seen, in this implementation, since the RTT can accurately reflect a channel state or channel condition of the terminal device, by selecting the random access type according to the RTT, it is possible to effectively ensure random access performance of the terminal device.

In an implementation, the terminal device selects the random access type according to the target information as follows. The terminal device determines a first value according to the RTT and the RSRP. If the first value is greater than a first threshold, the terminal device selects the contention-based 2-step random access. If the first value is less than or equal to the first threshold, the terminal device selects the contention-based 4-step random access.

Optionally, the terminal device determines the first value according to the RTT and the RSRP as follows. The terminal device determines the first value according to a reference RTT, the RTT, and the RSRP.

The reference RTT and the first threshold may be broadcast by the network device, or may be specified in a protocol, which is not limited herein.

In addition, the terminal device determines the first value according to the reference RTT, the RTT, and the RSRP as follows. The terminal device determines the first value according to a first formula, the reference RTT, the RTT, and the RSRP. The first formula is $K=(RTT_1-RTT_2) \times RSRP$, where K is the first value, $RTT_1$ is the reference RTT, and $RTT_2$ is an RTT measured by the terminal device.

As can be seen, in this implementation, since the RTT and the RSRP both can reflect a channel state of the terminal device, by selecting the random access type according to both the RTT and the RSRP, it is possible to effectively ensure random access performance of the terminal device.

In an implementation, the terminal device selects the random access type according to the target information as follows. If the RTT is less than the RTT threshold and the RSRP is greater than or equal to the RSRP threshold, the terminal device selects the contention-based 2-step random access. If the RTT is greater than or equal to the RTT threshold and/or the RSRP is less than the RSRP threshold, the terminal device selects the contention-based 4-step random access.

As can be seen, in this implementation, since the RTT and the RSRP both can reflect a channel state of the terminal device, by selecting the random access type according to both the RTT and the RSRP, it is possible to effectively ensure random access performance of the terminal device.

In an implementation, the terminal device selects the random access type according to the target information as follows. If the TA is less than the TA threshold, the terminal device selects the contention-based 2-step random access. If the TA is greater than or equal to the TA threshold, the terminal device selects the contention-based 4-step random access.

As can be seen, in this implementation, since the TA can accurately reflect a channel state of the terminal device, by selecting the random access type according to the TA, it is possible to effectively ensure random access performance of the terminal device.

In an implementation, the terminal device selects the random access type according to the target information as follows. The terminal device determines a second value according to the TA and the RSRP. If the second value is greater than a second threshold, the terminal device selects the contention-based 2-step random access. If the second value is less than or equal to the second threshold, the terminal device selects the contention-based 4-step random access.

Optionally, the terminal device determines the second value according to the TA and the RSRP as follows. The terminal device determines the second value according to a reference TA, the TA, and the RSRP.

The reference TA and the second threshold may be broadcast by the network device, or may be specified in a protocol, which is not limited herein.

In addition, the terminal device determines the second value according to the reference TA, the TA, and the RSRP as follows. The terminal device determines the second value according to a second formula, the reference TA, the TA, and the RSRP. The second formula is $K=(TA_1-TA_2)\times RSRP$, where K is the second value, $TA_1$ is the reference TA, and the $TA_2$ is the TA estimated by the terminal device.

As can be seen, in this implementation, since the TA and the RSRP both can reflect a channel state of the terminal device, by selecting the random access type according to both the TA and the RSRP, it is possible to effectively ensure random access performance of the terminal device.

In an implementation, the terminal device selects the random access type according to the target information as follows. If the TA is less than the TA threshold and the RSRP is greater than or equal to the RSRP threshold, the terminal device selects the contention-based 2-step random access. If the TA is greater than or equal to the TA threshold and/or the RSRP is less than the RSRP threshold, the terminal device selects the contention-based 4-step random access.

As can be seen, in this implementation, since the TA and the RSRP both can reflect a channel state of the terminal device, by selecting the random access type according to both the TA and the RSRP, it is possible to effectively ensure random access performance of the terminal device.

As can be seen, in implementations of the disclosure, the random access type is selected based on at least one of RTT, TA, or RSRP, which can effectively ensure random access performance of the terminal device.

Figure 9:
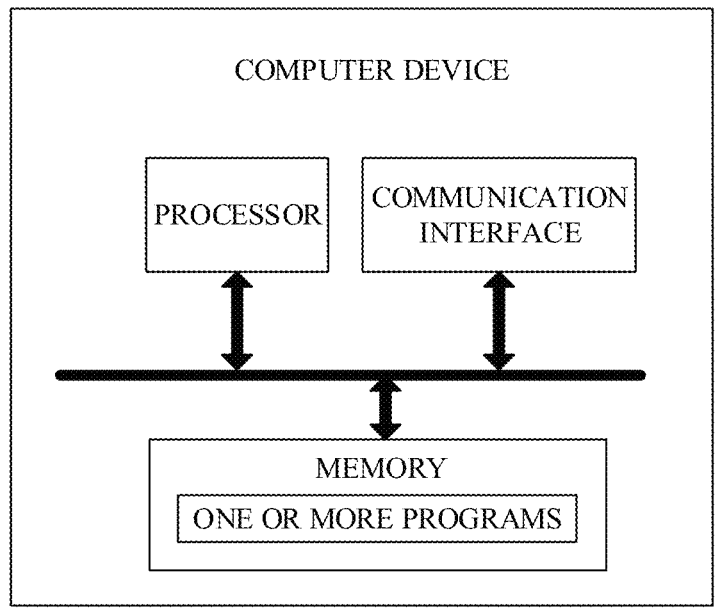
FIG. 9 is a schematic structural diagram of a computer device provided in implementations of the disclosure.

Refer to FIG. 9, which is a schematic structural diagram of a computer device provided in implementations of the disclosure. The computer device includes one or more processors, one or more memories, one or more communication interfaces, and one or more programs. The one or more programs are stored in the memory and configured to be executed by the one or more processors.

Device Embodiment 1

The computer device is a terminal device. The programs include instructions used for performing the following steps. A random access type is selected according to target information, where the target information includes at least one of an RTT of signal propagation between the terminal device and a network device, a TA estimated by the terminal device, or an RSRP measured by the terminal device.

In an implementation, before selecting the random access type according to the target information, the programs include instructions further used for performing the following steps. Configuration information broadcast by the network device is received, where the configuration information includes a first RACH resource configuration used for a contention-based 4-step random access and a msgA resource configuration used for a contention-based 2-step random access, the configuration information further includes at least one of an RTT threshold or a TA threshold, and the msgA resource configuration includes a second RACH resource configuration and a PUSCH resource configuration.

In an implementation, in terms of selecting the random access type according to the target information, the programs include instructions specifically used for performing the following steps. The contention-based 2-step random access is selected if the RTT is less than the RTT threshold. The contention-based 4-step random access is selected if the RTT is greater than or equal to the RTT threshold.

In an implementation, in terms of selecting the random access type according to the target information, the programs include instructions specifically used for performing the following steps. A first value is determined according to the RTT and the RSRP. A contention-based 2-step random access is selected if the first value is greater than a first threshold. A contention-based 4-step random access is selected if the first value is less than or equal to the first threshold.

In an implementation, in terms of determining the first value according to the RTT and the RSRP, the programs include instructions specifically used for performing the following steps. The first value is determined according to a reference RTT, the RTT, and the RSRP.

In an implementation, the configuration information further includes an RSRP threshold. In terms of selecting the random access type according to the target information, the programs include instructions specifically used for performing the following steps. The contention-based 2-step random access is selected if the RTT is less than the RTT threshold and the RSRP is greater than or equal to the RSRP threshold. The contention-based 4-step random access is selected if the RTT is greater than or equal to the RTT threshold and/or the RSRP is less than the RSRP threshold.

In an implementation, in terms of selecting the random access type according to the target information, the programs include instructions specifically used for performing the following steps. The contention-based 2-step random access is selected if the TA is less than the TA threshold. The contention-based 4-step random access is selected if the TA is greater than or equal to the TA threshold.

In an implementation, in terms of selecting the random access type according to the target information, the programs include instructions specifically used for performing the following steps. A second value is determined according to the TA and the RSRP. A contention-based 2-step random access is selected if the second value is greater than a second threshold. A contention-based 4-step random access is selected if the second value is less than or equal to the second threshold.

In an implementation, in terms of determining the second value according to the TA and the RSRP, the programs include instructions specifically used for performing the following steps. The second value is determined according to a reference TA, the TA, and the RSRP.

In an implementation, the configuration information further includes an RSRP threshold. In terms of selecting the random access type according to the target information, the programs include instructions specifically used for performing the following steps. The contention-based 2-step random access is selected if the TA is less than the TA threshold and the RSRP is greater than or equal to the RSRP threshold. The contention-based 4-step random access is selected if the TA is greater than or equal to the TA threshold and/or the RSRP is less than the RSRP threshold.

In an implementation, the programs include instructions further used for performing the following steps. MsgA is transmitted on a first resource if the contention-based 2-step random access is selected, where the first resource includes one RACH resource selected from the second RACH resource configuration and one PUSCH resource selected from the PUSCH resource configuration. Msg1 is transmitted on a second resource when the contention-based 4-step random access is selected, where the second resource includes one RACH resource selected from the first RACH resource configuration.

Device Embodiment 2

The computer device is a network device. The programs include instructions used for performing the following steps. Configuration information is broadcast, where the configuration information includes a first RACH resource configuration used for a contention-based 4-step random access and a msgA resource configuration used for a contention-based 2-step random access, the configuration information further includes at least one of an RTT threshold or a TA threshold, and the msgA resource configuration includes a second RACH resource configuration and a PUSCH resource configuration.

In an implementation, the configuration information further includes an RSRP threshold.

In an implementation, the programs include instructions further used for performing the following steps. MsgA or msg1 transmitted by a terminal device is received. The msgA is transmitted on a first resource by the terminal device if the contention-based 2-step random access is selected, where the first resource includes one RACH resource selected from the second RACH resource configuration and one PUSCH resource selected from the PUSCH resource configuration. The msg1 is transmitted on a second resource by the terminal device if the contention-based 4-step random access is selected, where the second resource includes one RACH resource selected from the first RACH resource configuration.

It is to be noted that, for the specific implementation process of these implementations, reference can be made to the specific implementation process of the foregoing method implementations, which will not be elaborated again herein.

Figure 10:
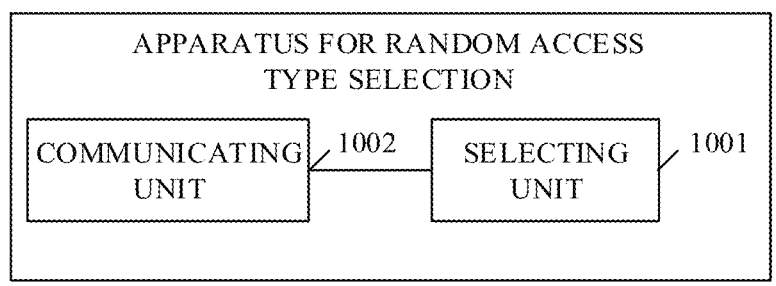
FIG. 10 is a schematic structural diagram of an apparatus for random access type selection provided in implementations of the disclosure.

Refer to FIG. 10, which is a schematic structural diagram of an apparatus for random access type selection provided in implementations of the disclosure. The apparatus is applicable to a terminal device. The apparatus includes a selecting unit 1001. The selecting unit 1001 is configured to select a random access type according to target information, where the target information includes at least one of an RTT of signal propagation between the terminal device and a network device, a TA estimated by the terminal device, or an RSRP measured by the terminal device.

In an implementation, the apparatus further includes a communicating unit 1002. The communicating unit 1002 is configured to receive configuration information broadcast by the network device before the selecting unit 1001 selects the random access type according to the target information, where the configuration information includes a first RACH resource configuration used for a contention-based 4-step random access and a msgA resource configuration used for a contention-based 2-step random access, the configuration information further includes at least one of an RTT threshold or a TA threshold, and the msgA resource configuration includes a second RACH resource configuration and a PUSCH resource configuration.

In an implementation, in terms of selecting the random access type according to the target information, the selecting unit 1001 is specifically configured to select the contention-based 2-step random access if the RTT is less than the RTT threshold, and select the contention-based 4-step random access if the RTT is greater than or equal to the RTT threshold.

In an implementation, in terms of selecting the random access type according to the target information, the selecting unit 1001 is specifically configured to determine a first value according to the RTT and the RSRP, and select a contention-based 2-step random access if the first value is greater than a first threshold or select a contention-based 4-step random access if the first value is less than or equal to the first threshold.

In an implementation, in terms of determining the first value according to the RTT and the RSRP, the selecting unit 1001 is specifically configured to determine the first value according to a reference RTT, the RTT, and the RSRP.

In an implementation, the configuration information further includes an RSRP threshold. In terms of selecting the random access type according to the target information, the selecting unit 1001 is specifically configured to select the contention-based 2-step random access if the RTT is less than the RTT threshold and the RSRP is greater than or equal to the RSRP threshold, and select the contention-based 4-step random access if the RTT is greater than or equal to the RTT threshold and/or the RSRP is less than the RSRP threshold.

In an implementation, in terms of selecting the random access type according to the target information, the selecting unit 1001 is specifically configured to select the contention-based 2-step random access if the TA is less than the TA threshold, and select the contention-based 4-step random access if the TA is greater than or equal to the TA threshold.

In an implementation, in terms of selecting the random access type according to the target information, the selecting unit 1001 is specifically configured to determine a second value according to the TA and the RSRP, and select a contention-based 2-step random access if the second value is greater than a second threshold or select a contention-based 4-step random access if the second value is less than or equal to the second threshold.

In an implementation, in terms of determining the second value according to the TA and the RSRP, the selecting unit 1001 is specifically configured to determine the second value according to a reference TA, the TA, and the RSRP.

In an implementation, the configuration information further includes an RSRP threshold. In terms of selecting the random access type according to the target information, the selecting unit 1001 is specifically configured to select the contention-based 2-step random access if the TA is less than the TA threshold and the RSRP is greater than or equal to the RSRP threshold, and select the contention-based 4-step random access if the TA is greater than or equal to the TA threshold and/or the RSRP is less than the RSRP threshold.

In an implementation, the communicating unit 1002 is further configured to transmit msgA on a first resource if the contention-based 2-step random access is selected, where the first resource includes one RACH resource selected from the second RACH resource configuration and one PUSCH resource selected from the PUSCH resource configuration. The communicating unit 1002 is further configured to transmit msg1 on a second resource if the contention-based 4-step random access is selected, where the second resource includes one RACH resource selected from the first RACH resource configuration.

It is to be noted that, the selecting unit 1001 may be implemented by a processor, and the communicating unit 1002 may be implemented by a communication interface.

Figure 11:
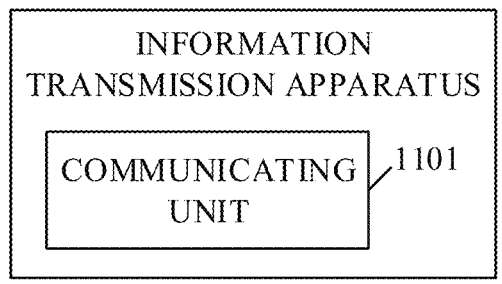
FIG. 11 is a schematic structural diagram of an information transmission apparatus provided in implementations of the disclosure.

Refer to FIG. 11, which is a schematic structural diagram of an information transmission apparatus provided in implementations of the disclosure. The apparatus is applicable to a network device. The apparatus includes a communicating unit 1101. The communicating unit 1101 is configured to broadcast configuration information, where the configuration information includes a first RACH resource configuration used for a contention-based 4-step random access and a msgA resource configuration used for a contention-based 2-step random access, the configuration information further includes at least one of an RTT threshold or a TA threshold, and the msgA resource configuration includes a second RACH resource configuration and a PUSCH resource configuration.

In an implementation, the configuration information further includes an RSRP threshold.

In an implementation, the communicating unit 1101 is further configured to receive msgA or msg1 transmitted by a terminal device. The msgA is transmitted on a first resource by the terminal device if the contention-based 2-step random access is selected, where the first resource includes one RACH resource selected from the second RACH resource configuration and one PUSCH resource selected from the PUSCH resource configuration. The msg1 is transmitted on a second resource by the terminal device if the contention-based 4-step random access is selected, where the second resource includes one RACH resource selected from the first RACH resource configuration.

It is to be noted that, the communicating unit 1101 may be implemented by a communication interface.

Implementations of the disclosure further provide a computer storage medium. The computer storage medium is configured to store computer programs used for electronic data interchange (EDI) which are operable with a computer to perform any method described in the foregoing method implementations. The computer described above includes a terminal device or a network device.

Implementations of the disclosure further provide a computer program product. The computer program product includes computer program instructions. The computer program instructions are operable with a computer to perform any method described in the foregoing method implementations. The computer program product may be a software installation package. The computer described above includes a terminal device or a network device.

Implementations of the disclosure further provide a chip. The chip includes computer program instructions. The computer program instructions are operable with a computer to perform any method described in the foregoing method implementations. The computer described above includes a user equipment (UE).

Implementations of the disclosure further provide a computer program. The computer program is operable with a computer to perform any method described in the foregoing method implementations. The computer described above includes a UE.

It is to be noted that, for the sake of simplicity, various method implementations above are described as a series of action combinations. However, it will be appreciated by those skilled in the art that the disclosure is not limited by the sequence of actions described. According to the disclosure, some steps may be performed in other orders or simultaneously. In addition, it will be appreciated by those skilled in the art that the implementations described in the specification are preferable implementations, and the actions and modules involved are not necessarily essential to the disclosure.

In the foregoing implementations, the description of each implementation has its own emphasis. For the parts not described in detail in one implementation, reference may be made to related descriptions in other implementations.

It will be appreciated that the apparatuses disclosed in implementations of the disclosure may also be implemented in various other manners. For example, the above apparatus implementations are merely illustrative, e.g., the division of units is only a division of logical functions, and other manners of division may also be available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical or otherwise.

Units illustrated as separated components may or may not be physically separated. Components displayed as units may or may not be physical units, and may reside at one location or may be distributed to multiple networked units. Some or all of the units may be selectively adopted according to practical needs to achieve desired objectives of the solutions of implementations.

In addition, various functional units described in various implementations of the disclosure may be integrated into one processing unit or may be present as a number of physically separated units, and two or more units may be integrated into one. The integrated unit may take the form of hardware or a software functional unit.

If the integrated unit is implemented as software functional units and sold or used as standalone products, it may be stored in a computer readable memory. Based on such an understanding, the essential technical solutions of the disclosure, or the portion that contributes to the prior art, or all or part of the technical solutions may be embodied as software products. The computer software products can be stored in a memory and may include multiple instructions that, when executed, can cause a computer device, e.g., a personal computer, a server, a network device, etc., to execute some or all operations of the methods described in various implementations of the disclosure. The above memory may include various kinds of media that can store program codes, such as a universal serial bus (USB) flash disk, a read-only memory (ROM), a random access memory (RAM), a mobile hard drive, a magnetic disk, an optical disk, etc.

Those of ordinary skill in the art can understand that all or some operations of various methods in the foregoing implementations can be implemented by instructing related hardware by a program. The program can be stored in a computer-readable memory. The memory can include a flash disk, a ROM, a RAM, a magnetic disk, an optical disk, etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for random access type selection, being applicable to a terminal device, the method comprising:

selecting a random access type according to target information, the target information comprising at least one of a round trip time (RTT) of signal propagation between the terminal device and a network device, a timing advance (TA) estimated by the terminal device, or a reference signal received power (RSRP) measured by the terminal device;

wherein selecting the random access type according to the target information comprises:
determining a first value according to both the RTT and the RSRP; and
selecting a contention-based 2-step random access when the first value is greater than a first threshold;
selecting a contention-based 4-step random access when the first value is less than or equal to the first threshold.

2. The method of claim 1, wherein before selecting the random access type according to the target information, the method further comprises:
receiving configuration information broadcast by the network device;
wherein the configuration information comprises a first random access channel (RACH) resource configuration used for a contention-based 4-step random access and a message A (msgA) resource configuration used for a contention-based 2-step random access, the configuration information further comprises at least one of an RTT threshold or a TA threshold, and the msgA resource configuration comprises a second RACH resource configuration and a physical uplink shared channel (PUSCH) resource configuration.

3. The method of claim 2, wherein when the configuration information comprises the RTT threshold only:
selecting the contention-based 2-step random access when the RTT is less than the RTT threshold;
selecting the contention-based 4-step random access when the RTT is greater than or equal to the RTT threshold.

4. The method of claim 3, further comprising:
transmitting msgA on a first resource when the contention-based 2-step random access is selected, wherein the first resource comprises one RACH resource selected from the second RACH resource configuration and one PUSCH resource selected from the PUSCH resource configuration;
transmitting msg1 on a second resource when the contention-based 4-step random access is selected, wherein the second resource comprises one RACH resource selected from the first RACH resource configuration.

5. The method of claim 2, wherein the configuration information further comprises the RTT threshold and an RSRP threshold, and selecting the random access type according to the target information comprises:
selecting the contention-based 2-step random access when the RTT is less than the RTT threshold and the RSRP is greater than or equal to the RSRP threshold;
selecting the contention-based 4-step random access when at least one of the following is satisfied: the RTT is greater than or equal to the RTT threshold, or the RSRP is less than the RSRP threshold.

6. The method of claim 2, wherein when the configuration information comprises the TA threshold only:
selecting the contention-based 2-step random access when the TA is less than the TA threshold;
selecting the contention-based 4-step random access when the TA is greater than or equal to the TA threshold.

7. The method of claim 2, wherein when the configuration information comprises the TA threshold and an RSRP threshold:

selecting the contention-based 2-step random access when the TA is less than the TA threshold and the RSRP is greater than or equal to the RSRP threshold;
selecting the contention-based 4-step random access when the TA is greater than or equal to the TA threshold and/or the RSRP is less than the RSRP threshold.

8. The method of claim 1, wherein determining the first value according to the RTT and the RSRP comprises:
determining the first value according to a reference RTT, the RTT, and the RSRP.

9. A terminal device, comprising:
a processor; and
a memory storing computer programs which, when executed by the processor, are operable with the processor to:
select a random access type according to target information, the target information comprising at least one of a round trip time (RTT) of signal propagation between the terminal device and a network device, a timing advance (TA) estimated by the terminal device, or a reference signal received power (RSRP) measured by the terminal device;
wherein the processor configured to select the random access type according to the target information is further configured to:
determine a first value according to both the RTT and the RSRP; and
select a contention-based 2-step random access when the first value is greater than a first threshold; or
select a contention-based 4-step random access when the first value is less than or equal to the first threshold.

10. The terminal device of claim 9, further comprising:
a transceiver;
wherein the computer programs, when executed by the processor, are operable with the transceiver to:
receive configuration information broadcast by the network device;
wherein the configuration information comprises a first random access channel (RACH) resource configuration used for a contention-based 4-step random access and a message A (msgA) resource configuration used for a contention-based 2-step random access, the configuration information further comprises at least one of an RTT threshold or a TA threshold, and the msgA resource configuration comprises a second RACH resource configuration and a physical uplink shared channel (PUSCH) resource configuration.

11. The terminal device of claim 10, wherein the processor configured to select the random access type according to the target information is configured to:
select the contention-based 2-step random access when the RTT is less than the RTT threshold; or
select the contention-based 4-step random access when the RTT is greater than or equal to the RTT threshold.

12. The terminal device of claim 10, wherein the configuration information further comprises an RSRP threshold, and the processor configured to select the random access type according to the target information is further configured to:
select the contention-based 2-step random access when the RTT is less than the RTT threshold and the RSRP is greater than or equal to the RSRP threshold; or
select the contention-based 4-step random access when at least of the following is satisfied: the RTT is greater than or equal to the RTT threshold, or the RSRP is less than the RSRP threshold.

13. The terminal device of claim 10, wherein the processor configured to select the random access type according to the target information is further configured to:
   select the contention-based 2-step random access when the TA is less than the TA threshold;
   select the contention-based 4-step random access when the TA is greater than or equal to the TA threshold.

* * * * *